W. H. WARD.
HUB AND AXLE.
No. 173,746. Patented Feb. 22, 1876.
FIG. I.
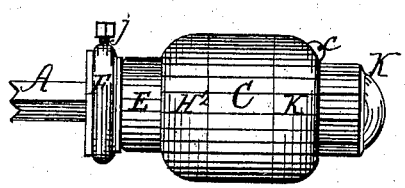
FIG. II.
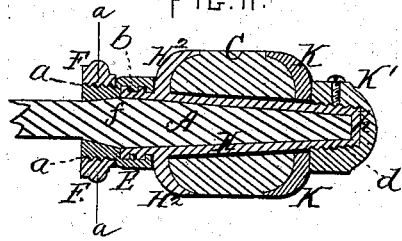
FIG. III.
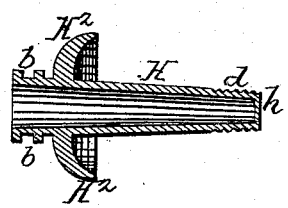
FIG. IV.
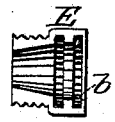
FIG. V.
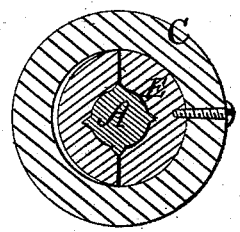
FIG. VI.
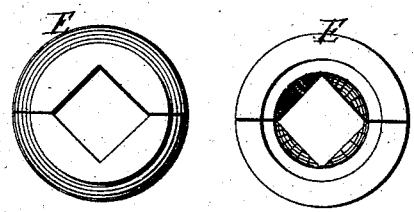
FIG. VII.
WITNESSES.
J. B. Townsend.
J. H. Rutherford
INVENTOR.
William H. Ward,
by Johnson and Johnson,
his Attorneys.

UNITED STATES PATENT OFFICE.

WILLIAM H. WARD, OF AUBURN, NEW YORK.

IMPROVEMENT IN HUBS AND AXLES.

Specification forming part of Letters Patent No. 173,746, dated February 22, 1876; application filed April 17, 1873.

*To all whom it may concern:*

Be it known that I, WILLIAM H. WARD, formerly of Auburn, New York, now of the city and county of Alexandria, in the State of Virginia, have invented certain new and useful Improvements in Hubs and Axles for Vehicles, of which the following is a specification:

My object is to obtain an axle without a shoulder, and thereby lessen the liability of the axle to break off at such points. This I do by constructing the axle of two oppositely-formed tapers, giving the effect of two wedges joined at their butts. One of these tapering parts is formed of angular surfaces, to receive a sectional sleeve of interior angular form to lock it from turning, while the hub-sleeve revolves upon the long taper, and the two are prevented from having any endwise movement upon the axle, as they join each other at the junction of the double tapers of the axle, and are thus prevented from having any endwise movement thereon, and thereby dispense with axle-collars. A separate collar fastens the sectional sleeve securely upon the tapering inclines.

In the claims I shall specifically point out and embrace what is new to me.

The state of the art shows that a metallic hub and sleeve combined, closed at its outer end, and held in place upon the axle by a sectional screw-sleeve fitting within a recess in the axle, and secured by a shoulder thereon, is not new; but in such case both the hub and its holding-screw sleeve turn together, and the axle has several shoulders formed upon the bearing portion thereof for securing the hub thereon. A wooden hub has also been clamped between two caps, one of which is made integral with the bearing-sleeve, and the other secured by a closed screw-cap, and in which the axle is provided with the usual shoulder for securing the hub to the axle. My improvements embrace an essentially different feature—an axle of two oppositely tapering surfaces for holding the hub thereon without shoulders or recesses formed upon said axle.

In the accompanying drawings, Figure 1 represents an elevation of a hub and axle embracing my invention; Fig. 2, a longitudinal section of the same; Fig. 3, a detached sectional view of the hub-sleeve disk; Fig. 4, a detached view of one of the sections of the screw-locking sleeve; Fig. 5, a cross-section at the line $a\ a$ of Fig. 2; Fig. 6, views of the opposite ends of the sectional sleeve; and Fig. 7, a view of the double-tapered axle.

Upon the axle A a long metallic sleeve, H, is fitted to revolve, and, being closed at its outer end $h$, incloses the axle to retain the grease and exclude the dust, and form an end bearing. It is provided near its inner end with a flange or disk, $H^2$, made integral with the sleeve, and concave on its inner end, and projecting sufficiently to form the inner head for the hub, which is of wood, to rest against, the hub being of corresponding form to make a close-fitting joint. Upon this sleeve, and against the opposite end of the hub, is fitted a second disk, K, also concave on its inner side to fit the corresponding end of the hub, and between these two concave disks the hub C is secured and clamped. The sleeve H has a projecting neck back of the inner flange or disk $H^2$, and has suitable rings and grooves formed thereon, as shown at $b$, Figs. 2 and 3, to receive corresponding rings and grooves formed upon the interior portion of a short metallic sleeve, E, also secured upon the axle at the inner end of the hub, the function of which is to fit within each other, and lock the long sleeve in place upon the axle. This short sleeve is made in two equal sections to allow it to be fitted and clamped in place upon the axle and the projecting screw-neck of the hub-sleeve; and the hub being clamped upon the latter, the long sleeve revolves within the screw-neck of the short fixed sleeve. The axle is made with a double taper, that portion upon which the long sleeve turns being tapered from the junction of the short fixed sleeve with the long sleeve to the outer inclosed end, and that portion upon which the short sleeve is clamped being tapered from such joining-line in an opposite direction upon the axle, as shown at $f$, the said inward tapers terminating in points upon the square sides of the axle. These oppositely-formed tapers hold the two sleeves upon their proper relative positions upon the axle, so that they cannot move endwise thereon, but must remain, when secured, and hold the hub and wheel upon the axle-bearing. The ringed portion of the sectional sleeve is enlarged to receive the grooved neck of the long sleeve, inclose it, and fit snugly against the flange $H^2$ to form a close joint, and prevent the grease from working out. The rear portion of the sectional sleeve has a screw-thread, $a$, formed thereon, and which threaded portion $a$ increases in diameter from the end to receive a clamp locking-nut, F, and which, while holding and binding the two sections of the sleeve firmly together upon the axle, can be screwed up upon the inclined threaded sleeve, and thereby tighten the wheel and its clamping-disks more tightly upon the axle, and causing the wheel and its clamps to be fixtures for all practical purposes in keeping the wheel and its hub solid. To prevent the securing-sleeve from unscrewing, it is provided with a screw, $j$, which, when tightened down upon the threaded sleeve, will lock the nut F securely. The outer concave disk K is secured and clamped upon the axle-sleeve against the hub by means of a nut, K', screwed over and upon a thread, $d$, formed upon the outer end of the sleeve; and this nut is also secured by a screw passing through it against the sleeve, so that these parts must turn together with the sleeve and the wheel.

For lubricating the axle, a hole is made in the sleeve at any suitable point, and fitted with a plug, $c$, from the outside. The grease lubricates the axle and the interlocking rings of the sleeve.

If desired, suitable packing may be introduced at the point where the fixed sectional sleeve joins the revolving disk $H^2$, to prevent all escape of the oil at the wearing-joint.

The hub is provided with the usual openings for the spokes, and the latter may be secured in any suitable way to insure tight joints.

The long sleeve and its hub may be formed of a single metal casting, if desired, and the inner disk and its clamp-nut by this means dispensed with.

The following is claimed as new in wheeled hubs and their axles, namely:

1. The axle provided with the angular surface-inclines $f$ joining the tapering part A, and combined with sectional sleeve E, having interior angles, and the hub-sleeve H, whereby the sectional sleeve is prevented from turning upon the axle, and the hub secured thereby, as described.

2. The combination, with the axle having the tapering and angular-surface parts A $f$ for the fixed and revolving sleeves E H, of the separate collar F, whereby the sections of the fixed sleeve E are clamped fast to the angular inclines $f$ and to the inner sleeve, as described.

3. The combination, with the double-tapered axle, of the sleeve H E, the concave clamping-disks $H^2$ K for the hub, and the securing and adjusting nuts F and K' for the disks, substantially as set forth.

Given under my hand at Providence, Rhode Island, this 15th day of April, 1873.

W. H. WARD.

Witnesses:
 HENRY J. JOHNSON,
 EDWIN M. COYELL.